United States Patent [19]

Ohtake

[11] Patent Number: 4,840,470
[45] Date of Patent: Jun. 20, 1989

[54] DRIVE CONTROL OF ZOOM LENS IN ZOOMING SYSTEM

[75] Inventor: Yoshichi Ohtake, Kamakura, Japan

[73] Assignee: Victor Company of Japan, Ltd., Japan

[21] Appl. No.: 137,921

[22] Filed: Dec. 28, 1987

[30] Foreign Application Priority Data

Dec. 27, 1986 [JP] Japan .................... 61-313004
Dec. 27, 1986 [JP] Japan .................... 61-313005

[51] Int. Cl.$^4$ ............................................. G02B 15/00
[52] U.S. Cl. ...................................... 350/429; 354/402
[58] Field of Search ................. 350/429, 423, 427; 354/402

[56] References Cited

U.S. PATENT DOCUMENTS 3,522,981  8/1970  Kirstein et al.
3,680,459  8/1972  Okura
3,840,291  10/1974  Littmann et al.
4,623,226  11/1986  Fujii .................................. 350/423
4,687,303  8/1987  Takahashi et al. .................. 350/423

FOREIGN PATENT DOCUMENTS 336302  4/1977  Austria .
1110905  2/1962  Fed. Rep. of Germany .
2154084  5/1972  Fed. Rep. of Germany .
2154977  5/1973  Fed. Rep. of Germany .

*Primary Examiner*—Bruce Y. Arnold
*Assistant Examiner*—Loha Ben
*Attorney, Agent, or Firm*—Lowe, Price, LeBlanc, Becker & Shur

[57] ABSTRACT

An optical zooming system comprising a zoom lens device for varying the focal length of the zooming system by its own movement in directions of the optical axis thereof and a cylindrical cam device arranged to encase the zoom lens. The zoom lens device has an engaging pin at its peripheral surface which is engaged with a cam groove formed at the inner circumferential surface of the cylindrical cam device to be movable along the cam groove. The cylindrical cam device is coupled to a drive device to be rotated so that the zoom lens device is moved in the optical axis directions in response to the rotation of the cylindrical cam device. The cam groove has a configuration formed so that the focal length of the zooming system is varied in linear relationship to the angle of rotation of the cylindrical cam device.

6 Claims, 3 Drawing Sheets

DRIVE CONTROL OF ZOOM LENS IN ZOOMING SYSTEM

BACKGROUND OF THE INVENTION

The present invention relates generally to zooming systems, and more specifically to a zooming system which is arranged to control the moving speed of a zoom lens thereof in directions along its optical axis. This invention may be applicable particularly, but not exclusively, to video cameras.

A video camera having a zoom lens system as shown in FIG. 1, is known and comprises four groups of lens systems, i.e., a fixed convex lens system L1, a movable concave lens system L2, a movable convex lens system L3 and a fixed convex lens system L4. Image-information light 1 from an object to be taken at infinity focus, for example, is incident upon the fixed convex lens system L1 in a parallel state and then refracted so as to be focused on the second focal point F1 of the fixed convex lens system L1 and further refracted by means of the movable concave lens system L2 so as to be equivalent to a light beam emitted from the first focal point F3 of the movable convex lens system L3. The refraction light 1 due to the movable concave lens system L2 is collimated by means of the movable convex lens system L3 and then focused by means of the fixed convex lens system L4 to be image-formed on an image pickup surface 1 positioned to correspond to the second focal point F4 of the fixed convex lens system L4. Here, the focal lengths of the lens systems L1 to L4 are respectively illustrated at characters f1 to f4 and the focal length of this zoom lens system is represented by a character f0. In such a zoom lens system, the movable convex lens system L3 is movable in accordance with movement of the movable concave lens system L2 in the directions of its optical axis as indicated by reference character B in FIG. 1 so as to keep the formation position of an image corresponding to the object taken at infinity focus, resulting in control of the focal length f0 thereof, i.e., zooming. Here, let it be assumed that the distance between the second focal point F1 of the fixed convex lens system L1 and the movable concave lens system L2 is a and the distance between the first focal point F3 of the movable convex lens system L3 and the movable concave lens system L2 is b, the relationship in position between the movable concave lens system L2 and the movable convex lens system L3 is determined so as to satisfy the following equation (1):

$$\frac{1}{a} + \frac{1}{b} = \frac{1}{f2} \quad (1)$$

That is, in response to movement of the movable concave lens system L2. i.e., a change of the distance a therebetween, the movable convex lens system L3 is moved to change the distance b therebetween, thereby satisfying the above-mentioned equation (1). On the other hand, this zoom lens system is generally arranged such that the movements of the lens systems L2 and L3 in the optical-axis directions is effected by means of a cylindrical cam mechanism and the distance a and the angle $\theta$ of rotation of the cylindrical cam are in a linear relationship to each other as shown in FIG. 2. However, an important problem in such a zoom lens system relates to the fact that the focal length f0 thereof is not in a linear relation to the angle $\theta$ of rotation of the cylindrical cam and is abruptly varied with respect to the angle $\theta$ of rotation thereof, particularly, when the movable concave lens system L2 is moving toward the longer focus side thereof. This results in abrupt variation of the size of the image with respect to the same object, whereby the image becomes unnatural.

Furthermore, in such a zoom lens system, the focusing for an object positioned at finite focus is effected by movement of the fixed convex lens system L1 or L4 so that the image-formation point A is kept on the image-pickup surface 1. There is a problem which arises with this type of zoom lens system, however, in that the position of the image-formation point A changed due to the variation of the focal length f0 of this zoom lens system is not in a linear relationship to the angle $\theta$ of rotation of the cylindrical cam and abruptly varies with respect to the variation of the angle $\theta$ of rotation thereof, particularly, when the movable concave lens system L2 is moving toward its longer focus side. The position of the image-formation point A reaches the maximum when the object to be taken is at close range. Therefore, in the case of the focusing made by the fixed convex lens system L4 (rear lens system) when the object is at finite focus, particularly at close range, the abrupt variation of the position of the image-formation point A results in the fact that difficulty is encountered in terms of the follow-up of the fixed convex lens system L4, thereby causing out-of-focus of the image on zooming.

SUMMARY OF THE INVENTION

The present invention has been developed in order to remove the drawbacks inherent to the conventional zoom lens systems.

It is therefore an object of the present invention to provide a zoom lens system which is capable of surely preventing the occurrence of unnatural image and the out-of-focus of the image on zooming operation.

A feature of the present invention is that the movement of a zoom lens in the directions of its optical axis is controlled so that the focal length of a zooming system is varied in linear relationship to the zooming time.

Another feature of the present invention is that the movement of a zoom lens in the directions of its optical axis is controlled so that the image-formation point of an object to be taken in a close range is varied in linear relationship to the zooming time.

In accordance with the present invention, there is provided an optical zooming system comprising: zoom lens means for varying the focal length of the zooming system by its own movement in directions of the optical axis thereof, the zoom lens means having engaging means at its periperal surface; cylindrical cam means arranged to encase the zoom lens means and having a cam groove at its inner circumferential surface, the engaging means of the zoom lens means being engaged with the cam groove to be movable along the cam groove; and drive means coupled to the cylindrical cam means to rotate the cylindrical cam means so that the zoom lens means is moved in the optical axis directions in response to the rotation of the cylindrical cam means, the movement of the zoom lens means resulting from the engagement between the engaging means of the zoom lens means and the cam groove of the cylindrical cam means; wherein the cam groove has a configuration formed so that the focal length of the zooming system is varied in linear relationship to the angle of rotation of the cylindrical cam means.

In accordance with the present invention, there is further provided an optical zooming system comprising: zoom lens means for varying the focal length of the zooming system by its own movement in directions of the optical axis thereof, the zoom lens means having engaging means at its peripheral surface; cylindrical cam means arranged to encase the zoom lens means and having a cam groove at its inner circumferential surface, the engaging means of the zoom lens means being engaged with the cam groove to be movable along the cam groove; and drive means coupled to the cylindrical cam means to rotate the cylindrical cam means so that the zoom lens means is moved in the optical axis directions in response to the rotation of the cylindrical cam means, the movement of the zoom lens means resulting from the engagement between the engaging means of the zoom lens means and the cam groove of the cylindrical cam means; wherein the cam groove has a configuration formed so that the image-formation point of an object taken in a close range is varied in linear relationship to the angle of rotation of the cylindrical cam means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 4:
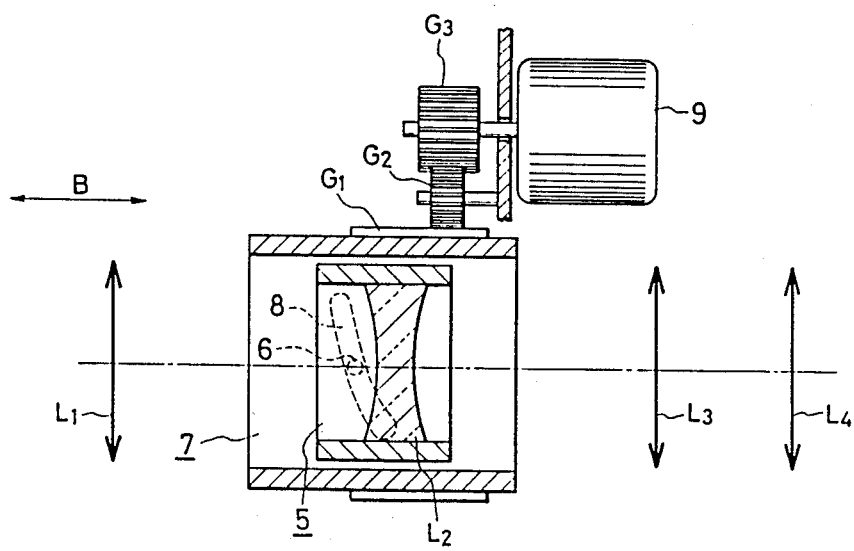
FIG. 4 is a cross-sectional view showing an arrangement of a zooming system according to the present invention.
Figure 5:
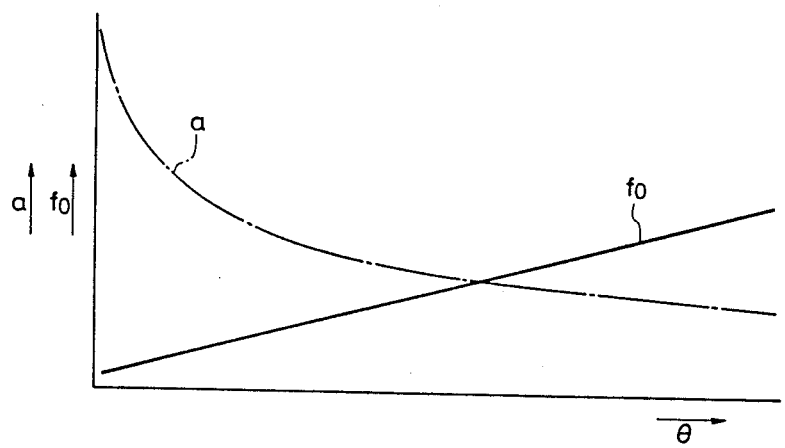
FIG. 5 shows the relationships between the position of a zoom lens system, the focal length and the angle of rotation of a cylindrical cam in an embodiment of a zooming system according to this invention.

Referring now to FIG. 4, there is illustrated a first embodiment of a zoom lens system according to the present invention which comprises a fixed convex lens system L1, a movable concave lens system L2, a movable convex lens system L3 and a fixed convex lens system L4 which are arranged similarly to the above-described conventional zoom lens system. The movable concave lens system L2 of the zoom lens system according to this invention is fixedly encased in a cylindrically shaped lens-barrel 5 which is in turn encased in a cylindrical cam device 7 so as to be slidable only in the directions of the optical axis of this zoom lens system. The lens-barrel 5 has a pin 6 which is protrusively planted on its peripheral surface and is engaged with a cam groove 8 formed in the inner surface of the cylindrical cam device 7. A first toothed wheel G1 is fixedly secured to its peripheral surface of the cylindrical cam device 7. The first toothed wheel G1 is coupled through a second toothed wheel G2 to a third toothed wheel G3 which is connected to the output shaft of a reversible motor 9. Therefore, in response to constant speed drive of the motor 9, the cylindrical cam device 7 is rotated so that the lens-barrel 5 is guided by the cam groove 8 and the movable concave lens system L2 is moved in the directions of its optical axis as indicated by B. Let it be assumed that the radius of the cylindrical cam device 7 is R and the angle $\theta$ of rotation thereof is expressed in unit of radian, the configuration of plane development of the cam groove 8 is made so as to take a curved line substantially coincident with a curved line obtained by expanding the curved line a of FIG. 5 in the direction of $\theta$, the curved line a of FIG. 5 representing the relationship between the angle $\theta$ of rotation of the cylindrical cam device 7 and the distance a between the second focal point (F1) of the fixed convex lens system L1 and the movable concave lens system L2. That is, when the cam groove 8 is formed to have a desired configuration, the variation per unit time of the focal length f0 of the zoom lens system due to movement of the movable concave lens system L2 in the optical axis directions becomes constant under the condition that the cylindrical cam device 7 is rotated at a constant speed, that is, the zooming drive is made at a constant speed. In other words, in response to the movement of the movable concave lens system L2, the focal length f0 of the zoom lens system varies substantially in linear relation to the angle $\theta$ of rotation of the cylindrical cam device 7.

A description will hereinbelow be made in terms of the configuration of the cam groove 8.

Initially, the linear variation of the focal length f0 with the variation of the rotational angle $\theta$ of the cylindrical cam device 7 means satisfication of the following equation (2):

$$\frac{df0}{d\theta} = K1 \text{ (constant)} \tag{2}$$

Figure 1:
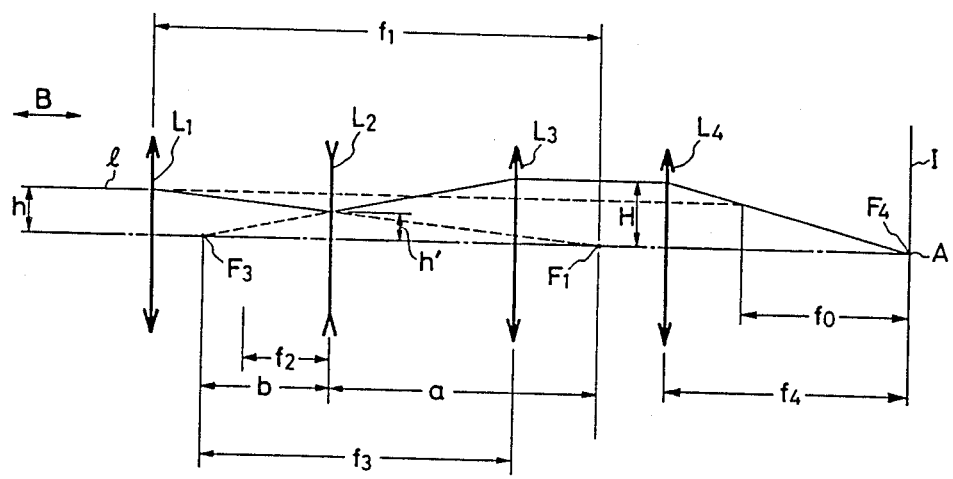
FIG. 1 is an illustration of an optical system of a zooming system.
Figure 2:
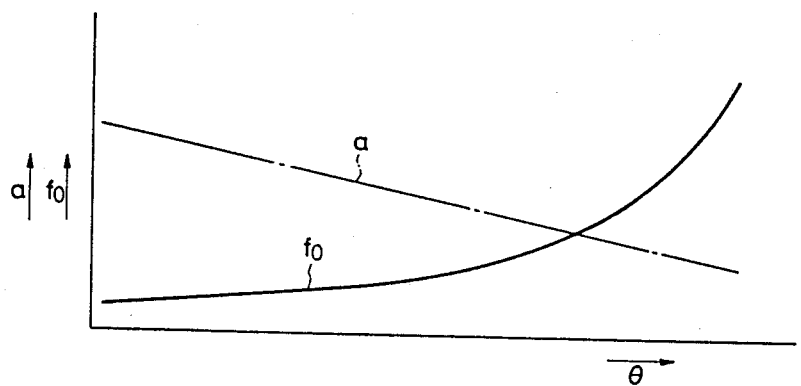
FIG. 2 shows the relationships between the focal length, the position of a zoom lens and the angle of rotation of a cylindrical cam in a conventional zooming system.
Figure 3:
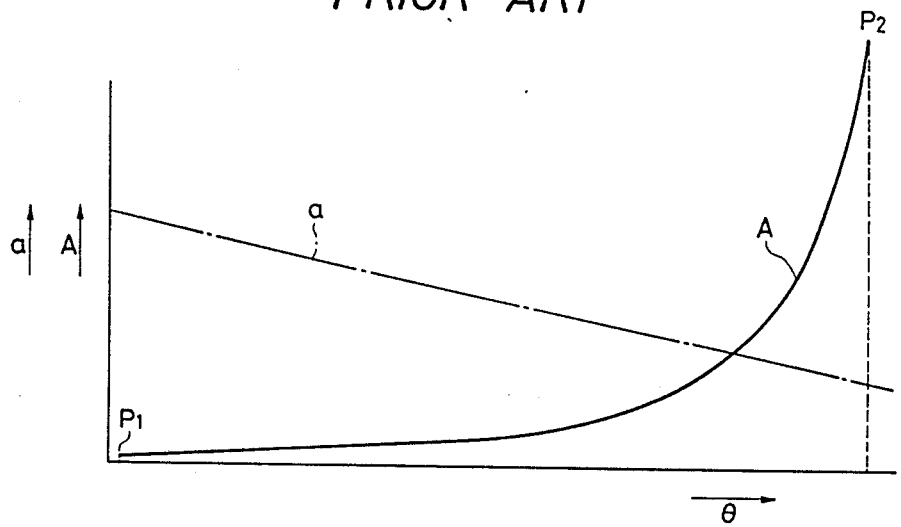
FIG. 3 illustrates the relationships between the position of a zoom lens, the image-formation point and the angle of rotation of a cylindrical cam in a conventional zooming system.

Here, in FIG. 1, the focal length f0 can be obtained as follows.

$$f0 = \frac{h}{H} f4 \tag{3}$$

Since h:h'=f1:a, H:h'=f3:b, the equation (3) can be rewritten as follows.

$$f0 = \frac{b}{a} \cdot \frac{f1}{f3} \cdot f4 \tag{4}$$

Here, b can be obtained as follows from the equation (1):

$$b = \frac{a \cdot f2}{a - f2} \tag{5}$$

Therefore, the following equation can be obtained by substitution of the equation (5) for the equation (4).

$$f0 = \frac{1}{a} \cdot \frac{a \cdot f2}{a - f2} \cdot \frac{f1}{f3} \cdot f4 \quad (6)$$
$$= \frac{f2}{a - f2} \cdot \frac{f1}{f3} \cdot f4$$

Here, in this equation (6), f1, f2, f3, f4 are constant, and therefore, in the case of:

$$K2 = \frac{f2 \cdot f1 \cdot f4}{f3} \quad (7)$$

the above-mentioned equation (2) can be expressed as follows.

$$\frac{df0}{d\theta} = \frac{d}{d\theta}\left(\frac{K2}{a - f2}\right) = K2\left(\frac{-1}{(a - f2)^2}\right)\frac{da}{d\theta} = K1 \quad (8)$$

Furthermore, in this equation (8), K1 is a constant and therefore the following equation (9) can be obtained.

$$\frac{da}{d\theta} = -\frac{K1}{K2} \cdot (a - f2)^2 \quad (9)$$

Accordingly, if the relation between a and $\theta$ is obtained to satisfy the equation (9), the variation rate (df/d$\theta$) of the focal length f0 with respect to the rotational angle $\theta$ becomes constant.

If the equation (9) is solved in terms of a, $$\frac{-1}{(a - f2)^2} da = \frac{K1}{K2} d\theta$$

$$\int \frac{-1}{(a - f2)^2} da = \int \frac{K1}{K2} d\theta$$

$$\frac{1}{a - f2} = \frac{K1}{K2} \theta + K3 \text{ (integration constant)}$$

$$a - f2 = \frac{1}{\frac{K1}{K2} \theta + K3}$$

and the relation between a and $\theta$ is as follows.

$$a = \frac{1}{\frac{K1}{K2} \theta + K3} + f2 \quad (10)$$

Therefore, in the case that the configuration of the cam groove 8 is determined so that the distance a based on the movement of the movable concave lens L2 according to the cam groove 8 satisfies the equation (10) in relation to the rotational angle $\theta$ of the cylindrical cam device 7, the focal length f0 varies in substantially linear relation to the rotational angle $\theta$ of the cylindrical cam device 7.

In addition, in this embodiment, the power-zoom motor 9 is rotated at a constant speed and therefore the rotational angle $\theta$ of the cylindrical cam device 7 is also varied at a constant speed. Therefore, the variation of the focal length f0 becomes in substantially linear relationship to the zooming time. Furthermore, when the visual angle of the object to be taken is $\alpha$, the size M of the image on the image surface can be expressed by the following equation (11).

$$M = 2f0 \cdot \tan\frac{\alpha}{2} \quad (11)$$

Therefore, in the case that the focal length f0 is varied in substantially linear relationship thereto, the image size M is similarly varied in substantial linearlity, thus allowing elimination of the unnatural variation of the image size M on zooming.

Here, assuming that the rotational angle $\theta$ of the cylindrical cam device 7 is $\omega t$, the relationship between the variation rate of the image size M and time on zooming can expressed as follows.

$$\frac{dM}{dt} = \frac{dM}{d\theta} \cdot \frac{d\theta}{dt} = \omega \frac{dM}{d\theta} \quad (12)$$
$$= \omega \tan\frac{\alpha}{2} \cdot \frac{df0}{d\theta}$$

This equation (12) is based on the fact that f0 is extremely small as compared with the distance to the object (even if finite) and $\alpha$ is substantially unchanged irrespective of variation of f0.

Therefore, in the case that df0/d$\theta$ in the equation (12) is constant, that is, in the case that the relationship between the distance a and the rotational angle $\theta$ is determined so as to satisfy the above-mentioned equation (10), the image size M is also varied in substantial linearity.

As described above, according to this embodiment, the configuration of the cam groove 8 of the cylindrical cam device 7 is formed so as to satisfy the equation (10) whereby the variation of the focal length f0 becomes substantially linear with respect to the zooming time and further the variation of the dimension M of the image on the image surface also becomes linear with respect to the time. Accordingly, when the cylindrical cam device 7 is rotated with a constant speed, this embodiment allows substantially linear variation of the focal length f0 of the zoom lens system and the image size M obtained using the zoom lens system with respect to zooming time, and this eliminates unnatural variation of the image on zooming. Furthermore, although in this embodiment the constant-speed rotation of the cylindrical cam device 7 is achieved using the power-zoom motor 9, the similar effect can be obtained in the case that the cylindrical cam device 7 is manually operated for zoom drive under the condition that its rotating speed is substantially constant.

Figure 6:
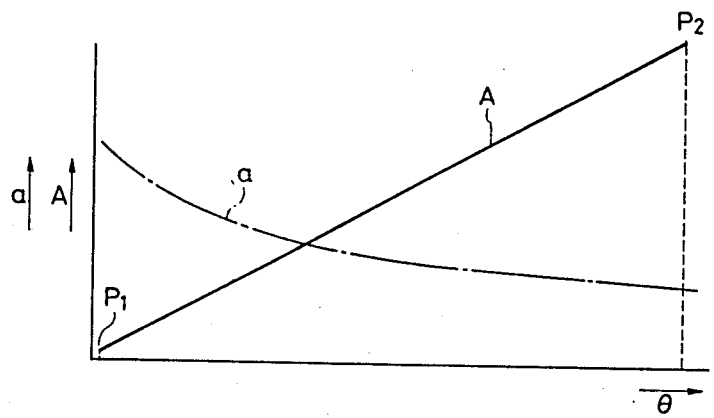
FIG. 6 shows the position of a zoom lens system, the image-formation point and the angle of rotation of a cylindrical cam in another embodiment of a zooming system according to this invention.
Figure 7:
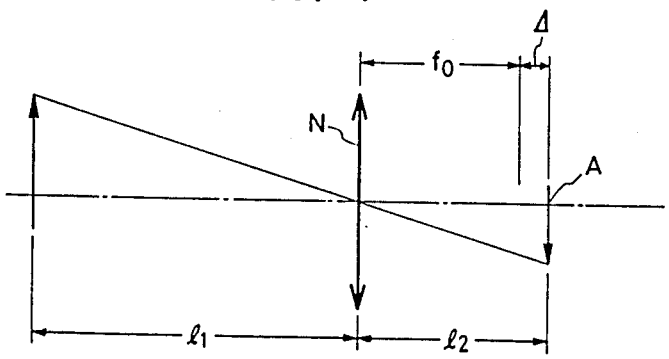
FIG. 7 is an illustration of the image-formation point due to the zoom lens system.

A further embodiment of the present invention will be described hereinbelow with reference to FIGS. 6 and 7, FIG. 6 illustrating a relationship between the angle $\theta$ of rotation of the cylindrical cam device 7, the image-formation point A and the distance (position) a of the movable concave lens system L2 and FIG. 7 illustrating a relationship in position between the image-formation point A and the object to be taken. One important difference between the first-mentioned embodiment and the second embodiment is that the configuration of the cam groove 8 in FIG. 4 is formed so that the image-formation point A varies in substantially linear relation to the zooming time in accordance with variation of the focal length f0 of the zoom lens system, that is, the variation of the image-formation point A per unit time (variation rate of A) becomes substantially constant under the condition of a constant speed drive of the cylindrical cam device 7.

A description will be made with respect to the configuration of the cam groove 8 in the second embodiment.

Let it be assumed that the variation of the image-formation point A is $\Delta$, the linear variation of the image-formation point A with the variation of the rotational angle $\theta$ of the cylindrical cam device 7 means satisfication of the following equation:

$$\frac{d\Delta}{d\theta} = K1' \text{ (constant)} \quad (13)$$

Here, for obtaining the above-mentioned variation $\Delta$, in FIG. 7, let it be assumed that the distance between the main or principal plane N of the zoom lens system and an object to be taken is l1 and the distance between the main or principal plane N and the image-formation point A is l2 and the focal length of the zoom lens system is f0, the relation thereamong is as follows.

$$\frac{1}{l1} + \frac{1}{l2} = \frac{1}{f0} \quad (14)$$

Thus, $$l2 = \frac{f0 \cdot l1}{l1 - f0} = f0 + \Delta \quad (15)$$

Accordingly, from this equation (15), $$\Delta = \frac{f0 \cdot l1}{l1 - f0} - f0 \quad (16)$$

$$= \frac{f0 \cdot l1 - f0 \cdot l1 + f0^2}{l1 - f0} = \frac{f0^2}{l1 - f0}$$

Because of $l1 >> f0$, the equation (16) is approximated as follows.

$$\Delta \approx \frac{f0^2}{l1} \quad (17)$$

Furthermore, the focal length f0 in the equation (16) is as follows in FIG. 1.

$$f0 = \frac{h}{H} f4 \quad (18)$$

Here, as obvious from FIG. 1, since h:h'=f1:a, H:h'=f3:b, the above equation (18) is rewritten as follows.

$$f0 = \frac{b}{a} \cdot \frac{f1}{f3} \cdot f4 \quad (19)$$

In addition, from the above-described equation (1), $$b = \frac{a \cdot f2}{a - f2} \quad (20)$$

If substituting (20) for (19), the equation (19) can be expressed as follows.

$$f0 = \frac{1}{a} \cdot \frac{a \cdot f2}{a - f2} \cdot \frac{f1}{f3} \cdot f4 \quad (21)$$

$$= \frac{f2}{a - f2} \cdot \frac{f1}{f3} \cdot f4$$

Here, in the equation (21), f1, f2, f3, f4 are constants, and if expressed as follows, $$\frac{f2 \cdot f1 \cdot f4}{f3} = k2 \quad (22)$$

the equation (21) can be expressed as follows.

$$f0 = \frac{k2}{a - f2} \quad (23)$$

Accordingly, the above equation (17) is rewritten as follows.

$$\Delta = \frac{f0^2}{l1} = \left(\frac{k2}{a - f2}\right)^2 / l1 \quad (24)$$

Thus, when substituting this equation (24) for (13), the following equation can be obtained.

$$\frac{d\Delta}{d\theta} = \frac{k2^2}{l1} \cdot \frac{-1 \cdot 2(a - f2)}{(a - f2)^4} \cdot \frac{da}{d\theta} \quad (25)$$

$$= \frac{-2k2^2}{l1(a - f3)^3} \cdot \frac{da}{d\theta} = k1'$$

Therefore, $$-\frac{1}{(a - f3)^3} da = \frac{l1 \cdot k1'}{2k2^2} d\theta \quad (26)$$

If the relation of a and $\theta$ is obtained to satisfy the equation (26), the rate of the variation $\Delta$ of the image-formation point A becomes constant with respect to the rotational angle $\theta$. Therefore, this equation (26) is solved with respect to a as follows.

$$-\int \frac{1}{(a - f2)^3} da = \int \frac{l1 \cdot K1'}{2K2^2} d\theta$$

$$\frac{1}{2(a - f2)^2} = \frac{l1 \cdot K1'}{2K2^2} \theta + \frac{k3'}{2}$$

where k3/2 is an integration constant. Therefore, the relation of a and $\theta$ can be obtained as follows.

$$a = \frac{1}{\sqrt{\frac{l1 \cdot K1'}{K2^2} \theta + K3'}} + f2 \quad (27)$$

Therefore, in the case that the configuration of the cam groove 8 is determined so that the distance a based on the movement of the movable concave lens L2 according to the cam groove 8 satisfies the equation (27) in relation to the rotational angle $\theta$ of the cylindrical cam device 7, image-formation point A varies in substantially linear relation to the rotational angle $\theta$ of the cylindrical cam device 7, l1 being a designed value of the shortest image-pickup distance.

In this second embodiment, the power-zoom motor 9 is rotated at a constant speed and therefore the rotational angle $\theta$ of the cylindrical cam 7 is varied at a constant rate and therefore the variation of the image-formation point A becomes in substantially linear relationship to the zooming time.

As described above, according to the second embodiment, the configuration of the cam groove 8 of the cylindrical cam device 7 is formed so as to satisfy the equation (27) whereby the variation of the image-formation point A with respect to the zooming time can be determined so as to linearly pass from a point P1 to a point P2 in FIG. 6. That is, under the condition of a constant-speed drive of the cylindrical cam device 7, the variation of the image-formation point A per unit time results in the minimum, thereby sufficiently allowing the follow-up of correction of the focusing lens system (fixed convex lens system L4) with respect to the variation of the image-formation point A and allowing prevention of the occurrence of out-of-focus on zooming operation. Here, the line representing variation of the image-formation point A in FIG. 6 has variation per unit time maximum value of which is the lowest among lines passing from the point P1 to the point P2. Accordingly, when the cylindrical cam device 7 is rotated with a constant speed, the variation of the image-formation point A of the zoom lens system according to this embodiment can be varied linearly with respect to the zoom time.

The present invention is not limited to the above-mentioned lens arrangement, but is applicable to other lens arrangements. A description will be made hereinbelow in terms of a configuration of the cam groove in this case.

In general zoom lens systems, the relationship between the position a of a lens system movable on zooming and the focal length f0 of the zoom lens system can be easily obtained. That is, the function f0=f0(a) can be obtained as at least numerical data (table or graph) even if it is not obtained as an algebraic expression. Therefore, the inverse function a=a(f0) and the derived function of the inverse function, i.e., da/df0=α(f0) ... (28), can be obtained. Now assuming that f0 is varied in linear relation to the angle θ of rotation of a cylindrical cam device, the following equations are satisfied.

$$f0 = k\theta + c \text{ where } k \text{ and } c \text{ are constants} \quad (29)$$

and $$\frac{df0}{d\theta} = k \quad (30)$$

Since $$\frac{da}{d\theta} = \frac{da}{df0} \cdot \frac{df0}{d\theta},$$

when substituting the equations (13) to (15) for this, $$\frac{da}{d\theta} = k \cdot \alpha(f0) = k \cdot \alpha(k\theta + c)$$

thus, $$a = k \int \alpha(k\theta + c) d\theta \quad (31)$$

This equation (31) is a function of θ and the value of a with respect to each of the values of θ can be obtained in accordance with a numerical integration. Further, when a is determined to satisfy the above equation (31), f0 is varied in linear relationship to θ. That is, when the derived function da/df0 of a for f0 is expressed by α(f0), f0 is varied in linear relation to θ under the condition that the cam configuration is formed so as to satisfy the equation $a = k \int \alpha(k\theta + c)d\theta$ where k and c are constants.

On the other hand, in order to establish the linear variation of the image-formation position A with respect to θ, in the above-mentioned equations (28) to (31), f0 and α(fo) are replaced with A and β(A). That is, when the derived function da/dA of a for A is expressed by β(A), the cam groove configuration is determined so as to satisfy an equation $a = k' \int (k'\theta + c')d\theta$ where k' and c' are constants, resulting in linear variation of A with respect to θ.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. An optical zooming system comprising:
zoom lens means for varying the focal length of said zooming system by its own movement in directions of the optical axis thereof, said zoom lens means having engaging means at its peripheral surface;
cylindrical cam means arranged to encase said zoom lens means and having a cam groove at its inner circumferential surface, said engaging means of said zoom lens means being engaged with said cam groove to be movable along said cam groove; and
drive means coupled to said cylindrical cam means to rotate said cylindrical cam means so that said zoom lens means is moved in the optical axis directions in response to the rotation of said cylindrical cam means, the movement of said zoom lens means resulting from the engagement between said engaging means of said zoom lens means and said cam groove of said cylindrical cam means;
wherein said cam groove has a configuration formed so that the focal length of said zooming system is varied in substantially linear relationship to the angle of rotation of said cylindrical cam means.

2. An optical zooming system as claimed in claim 1, wherein the rotational speed of said cylindrical cam means due to said drive means is constant.

3. An optical zooming system as claimed in claim 2, wherein the configuration of said cam groove is determined to satisfy the following equation:

$$a = \frac{1}{\frac{K1}{K2}\theta + K3} + f2$$

where a represents the position of said zoom lens means, K1, K2 and K3 are constants respectively, θ designates the angle of rotation of said cylindrical cam means, and f2 is the focal length of said zoom lens means.

4. An optical zooming system comprising:
zoom lens means for varying the focal length of said zooming system by its own movement in directions of the optical axis thereof, said zoom lens means having engaging means at its periperal surface;
cylindrical cam means arranged to encase said zoom lens means and having a cam groove at its inner circumferential surface, said engaging means of said zoom lens means being engaged with said cam groove to be movable along said cam groove; and
drive means coupled to said cylindrical cam means to rotate said cylindrical cam means so that said zoom lens means is moved in the optical axis directions in response to the rotation of said cylindrical cam means, the movement of said zoom lens means resulting from the engagement between said engaging means of said zoom lens means and said cam groove of said cylindrical cam means;

wherein said cam groove has a configuration formed so that the image-formation point of an object taken in a close range is varied in substantially linear relationship to the angle of rotation of said cylindrical cam means.

5. An optical zooming system as claimed in claim 4, wherein the rotational speed of said cylindrical cam means due to said drive means is constant.

6. An optical zooming system as claimed in claim 5, wherein the configuration of said cam groove is determined to satisfy the following equation:

$$a = \frac{1}{\sqrt{\frac{l1 \cdot K1'}{K2^2} \theta + K3'}} + f2$$

where a represents the position of said zoom lens means, l1 is the distance between the principal plane of said zooming system and the object, K1', K2' and K3' are constants respectively, $\theta$ designates the angle of rotation of said cylindrical cam means, and f2 is the focal length of said zoom lens means.

* * * * *